(12) United States Patent
Worden (10) Patent No.: US 10,605,489 B2
(45) Date of Patent: Mar. 31, 2020

(54) APPARATUSES AND ASSEMBLIES FOR A SOLAR PANEL INSTALLATION

(71) Applicant: GameChange Solar LLC, New York, NY (US)

(72) Inventor: Andrew Barron Worden, New York, NY (US)

(73) Assignee: Gamechange Solar Corp, New York, NY (US)

( * ) Notice: Subject to any disclaimer, the term of this patent is extended or adjusted under 35 U.S.C. 154(b) by 328 days.

(21) Appl. No.: 15/434,744

(22) Filed: Feb. 16, 2017

(65) Prior Publication Data

US 2017/0234580 A1     Aug. 17, 2017

Related U.S. Application Data

(60) Provisional application No. 62/295,858, filed on Feb. 16, 2016.

(51) Int. Cl.
| | |
|---|---|
| *F24S 30/42* | (2018.01) |
| *F16C 17/02* | (2006.01) |
| *F16C 35/02* | (2006.01) |
| *F24S 30/425* | (2018.01) |

(Continued)

(52) U.S. Cl.
CPC ............ *F24S 30/42* (2018.05); *F16C 17/022* (2013.01); *F16C 35/02* (2013.01); *F24S 30/425* (2018.05); *F16C 2300/14* (2013.01); *F16C 2300/32* (2013.01); *F16C 2362/00* (2013.01); *F24S 25/10* (2018.05); *F24S 2030/11* (2018.05); *F24S 2030/15* (2018.05); *Y02E 10/47* (2013.01)

(58) Field of Classification Search
CPC .... F16C 35/02; F16C 17/022; F16C 2300/32; F16C 2300/14; F16C 2362/00; F24S 30/425; F24S 30/42; F24S 2030/11; F24S 2030/15; F24S 25/10; Y02E 10/47
See application file for complete search history.

(56) References Cited

U.S. PATENT DOCUMENTS

| | | |
|---|---|---|
| 7,921,843 B1 | 4/2011 | Rawlings |
| 2008/0087275 A1 | 4/2008 | Sade et al. |
| 2011/0041834 A1 | 2/2011 | Liao |

(Continued)

*Primary Examiner* — Alfred Basichas (57) ABSTRACT

A bearing assembly comprises a bearing wheel with a rotational axis, the bearing wheel including and extending radially between an inner surface and an outer surface, wherein the inner surface at least partially forms a bore, the bore extends axially through the bearing wheel along the rotational axis, and the bore has a cross-sectional geometry configured to receive a rotatable shaft with a complementary cross-sectional geometry, and wherein the outer surface extends circumferentially around the rotational axis, and the outer surface has a circular cross-sectional geometry. The bearing assembly also comprises a bearing collar comprising a collar base and a collar mount, wherein the collar base includes an inner surface configured to circumscribe and slidingly engage the outer surface of the bearing wheel, wherein the collar mount projects radially out from collar base to a distal mount end, and wherein a plurality of mounting apertures at the distal mount end extend axially through the collar mount, and the mounting apertures are configured to respectively receive fasteners for securing the collar mount to a stationary structural member.

21 Claims, 11 Drawing Sheets

(51) Int. Cl.
*F24S 30/00* (2018.01)
*F24S 25/10* (2018.01)

(56) References Cited

U.S. PATENT DOCUMENTS

| | | | |
|---|---|---|---|
| 2013/0039610 A1* | 2/2013 | Schneider | F16C 17/02 384/428 |
| 2013/0294814 A1 | 11/2013 | Sader | |
| 2015/0136205 A1 | 5/2015 | Worden | |
| 2015/0171786 A1 | 6/2015 | Worden | |
| 2015/0200619 A1 | 7/2015 | Worden | |

* cited by examiner

APPARATUSES AND ASSEMBLIES FOR A SOLAR PANEL INSTALLATION

CROSS-REFERENCE TO RELATED APPLICATION

This application claims priority from the provisional application designated Ser. No. 62/295,858 filed Feb. 16, 2016 and entitled "Apparatuses and Assemblies for a Solar Panel Installation", and is hereby incorporated by reference.

BACKGROUND OF THE INVENTION

1. Technical Field

This disclosure relates generally to a solar panel installation and, more particularly, to apparatuses and assemblies for use in a solar panel installation.

2. Background Information

Solar panel support systems are of two major types. A first system is that of ground installation with heavy anchoring elements such as poured or blocks of cement or concrete which maintain the support structure in place against ambient weather conditions and the like. Ground systems, by their very nature, while supported by heavy anchoring elements designed to withstand inclement weather need to be installed efficiently over wide areas. In addition, efficient specifically oriented placement of panels is required with means for adjustment in order to best utilize the panels.

SUMMARY OF THE DISCLOSURE

According to an aspect of the present disclosure, a bearing assembly is provided. The bearing assembly may comprise a bearing wheel with a rotational axis. The bearing wheel may extend radially between an inner surface and an outer surface. The inner surface at least partially forms a bore. The bore may extend axially through the bearing wheel along the rotational axis. The bore can have a cross-sectional geometry configured to receive a rotatable shaft with a complementary cross-sectional geometry. The outer surface may extend circumferentially around the rotational axis. The outer surface may have a circular cross-sectional geometry. The bearing assembly further may comprise a bearing collar comprising a collar base and a collar mount, where the collar base includes an inner surface configured to circumscribe and slidingly engage the outer surface of the bearing wheel. The collar mount may project radially out from collar base to a distal mount end. A plurality of mounting apertures at the distal mount end may extend axially through the collar mount. The mounting apertures may be configured to respectively receive fasteners for securing the collar mount to a stationary structural member.

The bearing wheel may comprise a plurality of discrete segments, and the cross-sectional geometry of the base may be polygonal.

A first of the segments may be secured to a second of the segments.

An adjacent pair of the segments may not be attached to one another.

The plurality of segments may consist of a pair of bearing wheel halves.

The collar base may comprise a plurality of discrete segments which are secured together, the base mount projects out from and is integrally framed with a first of the segments, and the cross-sectional geometry of the bore is polygonal.

The first of the segments may extend between about 30 degrees and about 90 degrees around the rotational axis.

A capture ring may be secured to an axial side of the collar base, wherein the capture ring radially overlaps at least a portion of the bearing wheel.

A pair of capture rings may be secured to opposing axial sides of the collar base, wherein the capture rings project radially inward and thereby overlap opposing axial ends of the bearing ring.

According to another aspect of the present disclosure, an assembly for a solar panel installation is provided. The assembly may comprise a stationary structural member and a rotatable shaft. The assembly may also include a bearing wheel with a rotational axis, and the bearing wheel may extend radially between an inner surface and an outer surface. The inner surface at least partially forms a bore. The bore may extend axially through the bearing wheel along the rotational axis. The bore may have a cross-sectional geometry configured to receive the rotatable shaft which has a complementary cross-sectional geometry. The outer surface may extend circumferentially around the rotational axis. The outer surface may have a circular cross-sectional geometry. The assembly may also include a bearing collar comprising a collar base and a collar mount. The collar base may include an inner surface configured to circumscribe and slidingly engage the outer surface of the bearing wheel. The collar mount may project radially out from collar base to a distal mount end. A plurality of mounting apertures at the distal mount end may extend axially through the collar mount. The mounting apertures may be configured to respectively receive fasteners for securing the collar mount to the stationary structural member.

The stationary structural member may be configured to be securely anchored to the ground.

The rotatable shaft may comprise a length of square tubing.

The rotatable shaft may be configured to structurally support one or more solar panels.

According to another aspect of the present disclosure, an assembly for a solar panel installation is provided. The assembly may comprise a stationary structural member with a plurality of slots, a rotatable shaft having a cross-sectional geometry and a rotational axis. The assembly may also include a bearing wheel having a bore. The rotatable shaft is mated with the bearing wheel and projects axially through the bore. The assembly may also include a bearing collar comprising a collar base and a collar mount. The collar base may be configured to house the bearing wheel and provide a bearing surface for the bearing wheel to slidingly engage while moving with the rotatable shaft about the rotational axis. The collar base may project radially out from the collar base to a distal mount end. The assembly may also include a plurality of mounting apertures at the distal mount end extend axially through the collar mount. The assembly may further include a plurality of fasteners securing the bearing collar to the stationary structural member. Each of the fasteners may extend through a respective one of the slots and a respective one of the mounting apertures. One or more of the fasteners may be operable to be selectively positioned within the slots to change the vertical and/or lateral position of the bearing collar relative to the stationary structural member.

The assembly also includes a second bearing wheel having a bore. The rotatable shaft is mated with the bearing wheel and projects axially through the bore of the second bearing wheel. The assembly also includes a second bearing collar comprising a second collar base and a second collar mount. The second collar base is configured to house the second bearing wheel and provide a bearing surface for the second bearing wheel to slidingly engage while moving with the rotatable shaft about the rotational axis. The second collar base projects radially out from the second collar base to a second distal mount end. A plurality of second mounting apertures at the second distal mount end may extend axially through the second collar mount. The assembly may also include a plurality of second fasteners securing the second bearing collar to the stationary structural member. Each of the second fasteners may extend through a respective one of the slots and a respective one of the second mounting apertures. One or more of the second fasteners is operable to be selectively positioned within the slots to change the vertical and/or lateral position of the second bearing collar relative to the stationary structural member and the other bearing collar.

According to another aspect of the present disclosure, an assembly for a solar panel installation is provided. The assembly may comprise a stationary structural member having a length that extends longitudinally to a distal member end. The stationary structural member comprising a first flange, a second flange and a web extending between the first flange and the second flange. The assembly may also include a rotatable shaft having a rotatable axis. The rotatable shaft may be rotatably connected to the stationary structural member at the distal member end by one or more bearings. The assembly may also include a drive arm secured to the rotatable shaft and aligned with the stationary structural member along the rotational axis. The assembly may further comprise an actuator pivotally connected to the drive arm and pivotally connected between and to the first and the second flanges. A portion of the actuator may project through an opening in the web. The actuator may be configured to change its length in order to move the drive arm relative to the stationary structural member and thereby rotate the rotatable shaft about the rotational axis.

The portion of the actuator may include a motor.

An actuator mount may be clamped onto the actuator. The actuator mount may be pivotally connected to the stationary structural member by a shaft which extends between and is connected to the first and the second flanges.

The actuator may comprise a base and a pushrod. The base may be pivotally connected to the stationary structural member and the pushrod is pivotally connected to the drive arm.

The rotatable axis may be generally perpendicular to the length of the stationary structural member.

The actuator may be pivotally connected to the drive arm between two flanges of the drive arm.

The actuator may comprise a hydraulic piston.

The actuator may comprise a screw drive mechanism.

According to another aspect of the present disclosure, an assembly for a solar panel installation is provided. The assembly may comprise a stationary structural member having a length that extends longitudinally to a distal member end. The stationary structural member may comprise a first flange, a second flange and a web extending between the first flange and the second flange. The assembly may also include a rotatable shaft having a rotatable axis. The rotatable shaft may be rotatably connected to the stationary structural member at the distal member end by one or more bearings. The assembly may also include a drive arm secured to the rotatable shaft and aligned with the stationary structural member along the rotational axis. The assembly may also include an actuator aligned with the stationary structural member and the drive aim along the rotational axis. The actuator comprising an actuator base and a pushrod projecting out of the actuator base. The actuator base may be pivotally connected to and between the first and the second flanges. The pushrod may be pivotally connected to and between two mounts of the drive arm. The pushrod may be configured to move into and out of the actuator base in order to move the drive arm relative to the stationary structural member and thereby rotate the rotatable shaft about the rotational axis.

According to another aspect of the present disclosure, an assembly for a solar panel installation is provided. The assembly may comprise a stationary structural member having a length that extends longitudinally to a distal member end. The assembly may also include a rotatable shaft having a rotatable axis. The rotatable shaft may be rotatably connected to the stationary structural member at the distal member end by one or more bearings. The assembly may also include a drive mechanism configured to rotate the rotatable shaft about the rotatable axis. The drive mechanism mounted to the stationary structural member. The assembly may also include a wind break plate mounted to the rotatable shaft. The wind break plate may be configured to at least partially cover the distal member end and the drive mechanism.

A pair of purlin members may be located on opposing sides of the stationary structural member along the rotational axis. The purlin members may mount the wind break plate to the rotatable shaft.

A pair of solar panels may be located adjacent to the wind break plate and mounted to the rotatable shaft. The wind break plate may substantially close a gap between the solar panels.

A solar panel may be mounted to the wind break plate.

The solar panel may be operable to provide power to the drive mechanism.

The solar panel may be nested with an opening in the wind break plate over the distal member end.

According to another aspect of the present disclosure, a node controller for a solar panel installation with an actuator motor is provided. The node controller may comprise a processor, a tilt measuring device configured to measure tilt of a solar panel, a clock, a memory with a lookup table for use with the processor to determine what the tilt of the solar panel should be for a time of day based on one or more of the following parameters: location, sun elevation, sun azimuth, row spacing and/or slope for backtracking analysis. The node controller may also include one or more motor drivers configured to signal the actuator motor to turn until an appropriate tilt is reached. The node controller may include a wireless communication device for communicating with another device.

The other device may be a master controller.

A snow depth sensor may be provide data which can trigger a warning and/or an adjustment in an operational tilt range.

According to another aspect of the present disclosure, a master controller for communicating with a plurality of node controllers of a solar panel installation and for communicating with a wind speed sensor is provided. The master controller may comprise a processor configured with a memory and a communication device in order to periodically synch up clocks of the node controllers with a clock of the master controller to ensure uniform tilts of solar panels included in the solar panel array and to receive information from the node controllers about time of day and tilt to see if any of the solar panels are not at proper tilt or are not running.

The processor may be configured to relay data to another device or system using the communication device. The data may be indicative of information related to the operation of the solar panel installation.

According to another aspect of the present disclosure, a lateral capture device for a solar panel installation with a solar panel mounted on a rotatable shaft, which rotatable shaft is supported by a bearing is provided. The lateral capture device may comprise a U-bolt and a bracket. The bracket may be is configured to mate with the U-bolt in a manner so as to clamp the lateral capture device onto the rotatable shaft adjacent the bearing such that the rotatable shaft cannot move laterally relative to the bearing.

The foregoing features and the operation of the invention will become more apparent in light of the following description and the accompanying drawings.

DETAILED DESCRIPTION

Figure 1:
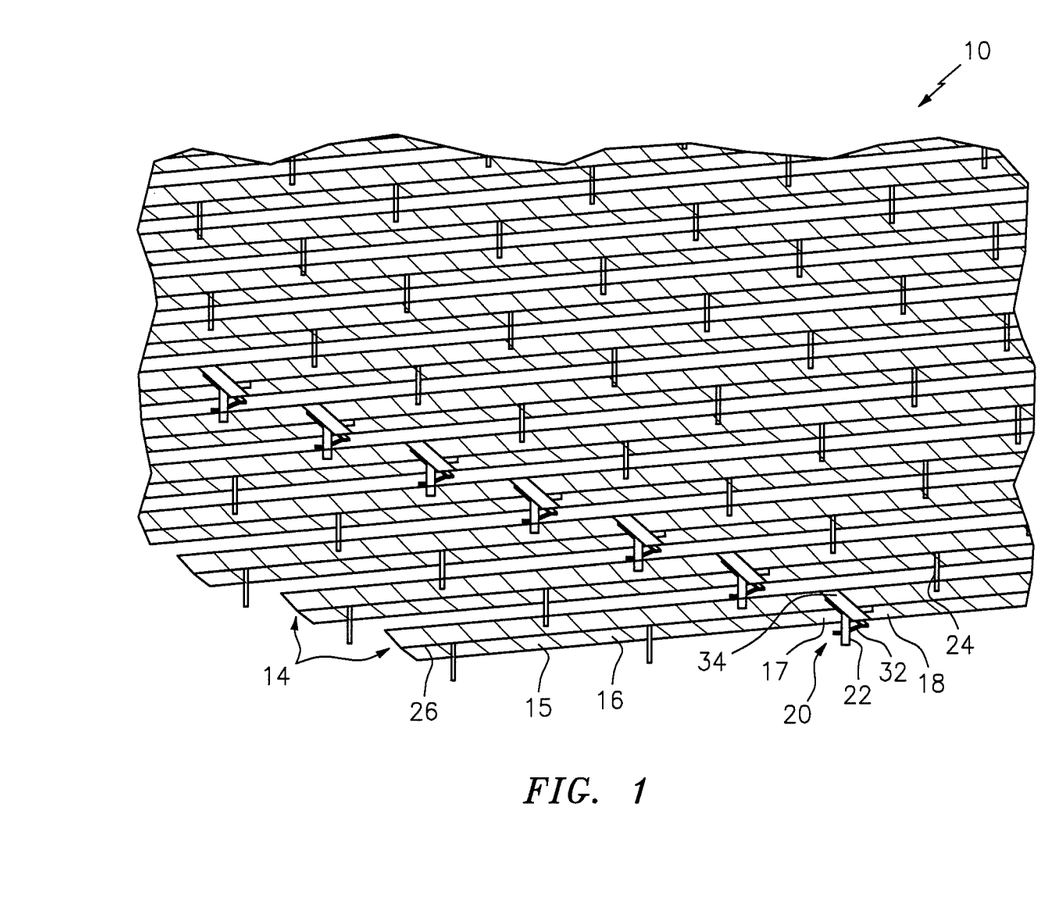
FIG. 1 illustrates a solar panel installation.

FIG. 1 illustrates a solar panel installation 10. An exemplary embodiment of such a solar panel installation is the Genius Tracker™ system designed by GameChange Racking of New York City, N.Y. Of course, the solar panel installation of the present disclosure is not limited to the specific exemplary. For examples, one or more of the Genius Tracker™ system components may be swapped out for components with alternate configurations, one or more the Genius Tracker™ system components may be omitted and/or the Genius Tracker™ system may be modified to include one or more additional components not specifically described herein.

Referring again to FIG. 1, the solar panel installation 10 includes one or more solar panel arrays 12, 14. Each of these solar panel arrays 12, 14 includes one or more solar panels 15-18 (e.g., a linear array of solar panels) mounted to a racking structure 20. Each racking structure 20 includes a plurality of stationary structural members 22, 24, a rotatable shaft 26, a plurality of bearing assemblies 28, 30 (see FIG. 5), and at least one drive mechanism 32. Each racking structure 20 may also include at least one wind break panel 34 for configuring with the drive mechanism 32.

Figure 2:
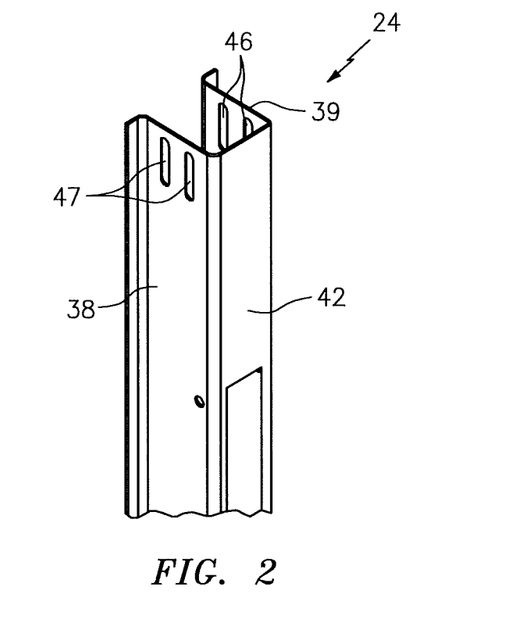
FIG. 2 illustrates a first embodiment of a stationary structural member.
Figure 3:
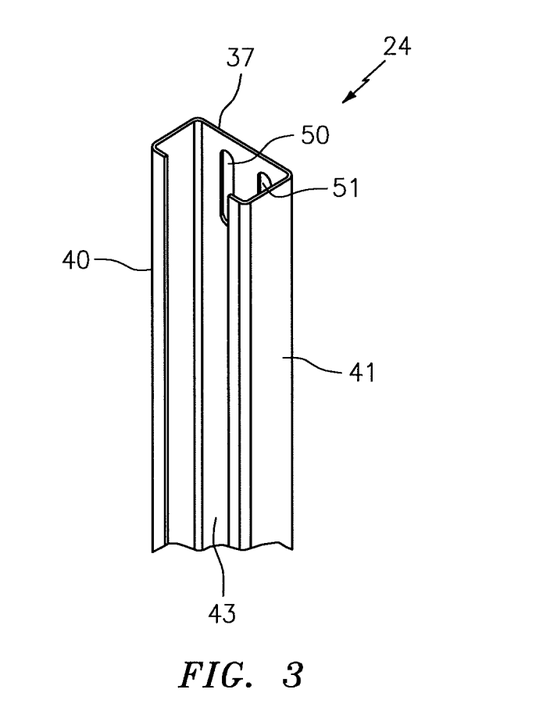
FIG. 3 illustrates a second embodiment of a stationary structural member.

FIGS. 2 and 3 respectively illustrate exemplary embodiments of the stationary structural members 22, 24. The stationary structural member of FIG. 2 is configured as a center post, or drive mechanism support post. The stationary structural member of FIG. 3 is configured as a standard post, or support post. In some embodiments, one or more of the stationary structural members may be securely anchored to the ground. For example, a bottom portion of the member's length may be buried in the ground and/or otherwise secured to or with a foundation, which may be a driven pile, helical screw, screw, precast or cast in place (e.g., Poured in Place available from GameChange) or any other foundation type. In other embodiments, one or more of the stationary structural members may be anchored to another structure such as, but not limited to, a building roof top.

Referring still to FIGS. 2 and 3, each stationary structural member has a length. This length extends longitudinally (e.g., substantially vertically when installed) from its bottom portion to a distal (e.g., top) member end 37. Each stationary structural member may include one or more flanges 38-41 and a central web 42, 43, which extends laterally (e.g., horizontally when installed) between the respective first and the second flanges. Each of the flanges 38, 39 of FIG. 2 includes one or more mounting apertures such as, but not limited to, a pair of longitudinal slots 46, 47. The web 43 of FIG. 3 similarly includes one or more mounting apertures such as, but not limited to, a pair of longitudinal slots 50, 51.

Figure 4:
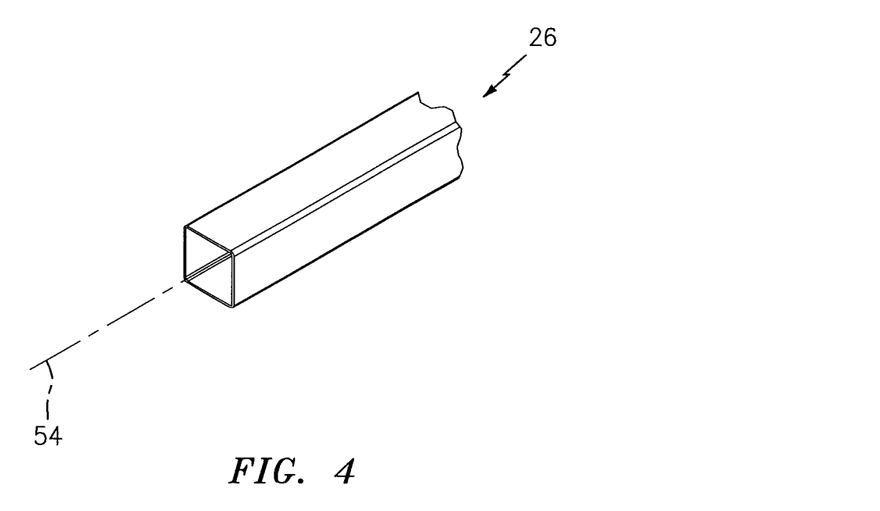
FIGS. 4 and 5 illustrate an exemplary embodiment of a rotatable shaft.
Figure 5:
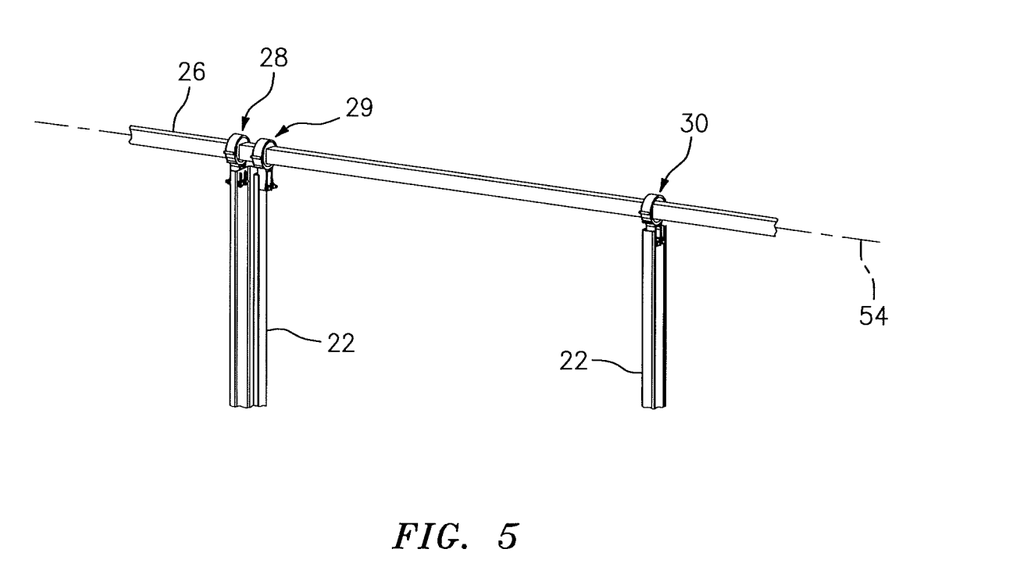
Figure 6:
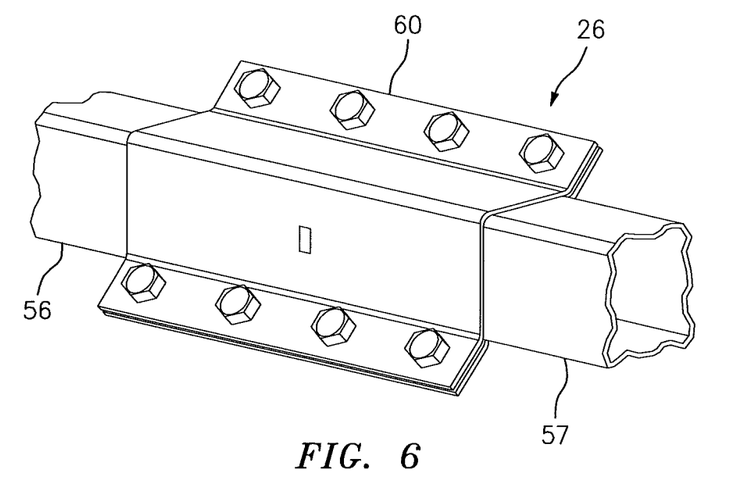
FIG. 6 illustrates adjacent segments coupled together with a coupler.

FIGS. 4 and 5 illustrate an exemplary embodiment of the rotatable shaft 26. The rotatable shaft has a length, which extends axially (e.g., substantially horizontally when installed) along a rotational axis 54. The rotatable shaft may be configured as a single length of shaft as shown in FIG. 5. Alternatively, the rotatable shaft 26 may be configured with a plurality of shaft segments 56, 57, where adjacent segments are coupled together with a coupler 60 (e.g., a clamping sleeve) as shown in FIG. 6 and/or otherwise connected to one another. The exemplary rotatable shaft of FIG. 4 has a polygonal (e.g., square) cross-sectional geometry; however, the rotatable shaft of the present disclosure is not limited to such a geometry.

Figure 7:
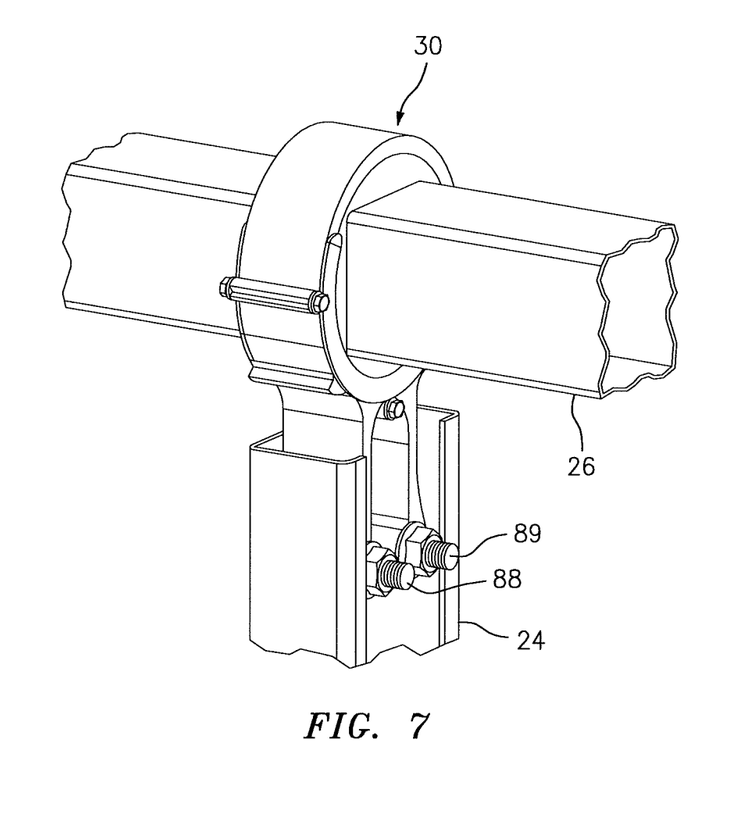
FIG. 7 illustrates a bearing assembly are configured to rotatably mount the rotatable shaft.
Figure 8:
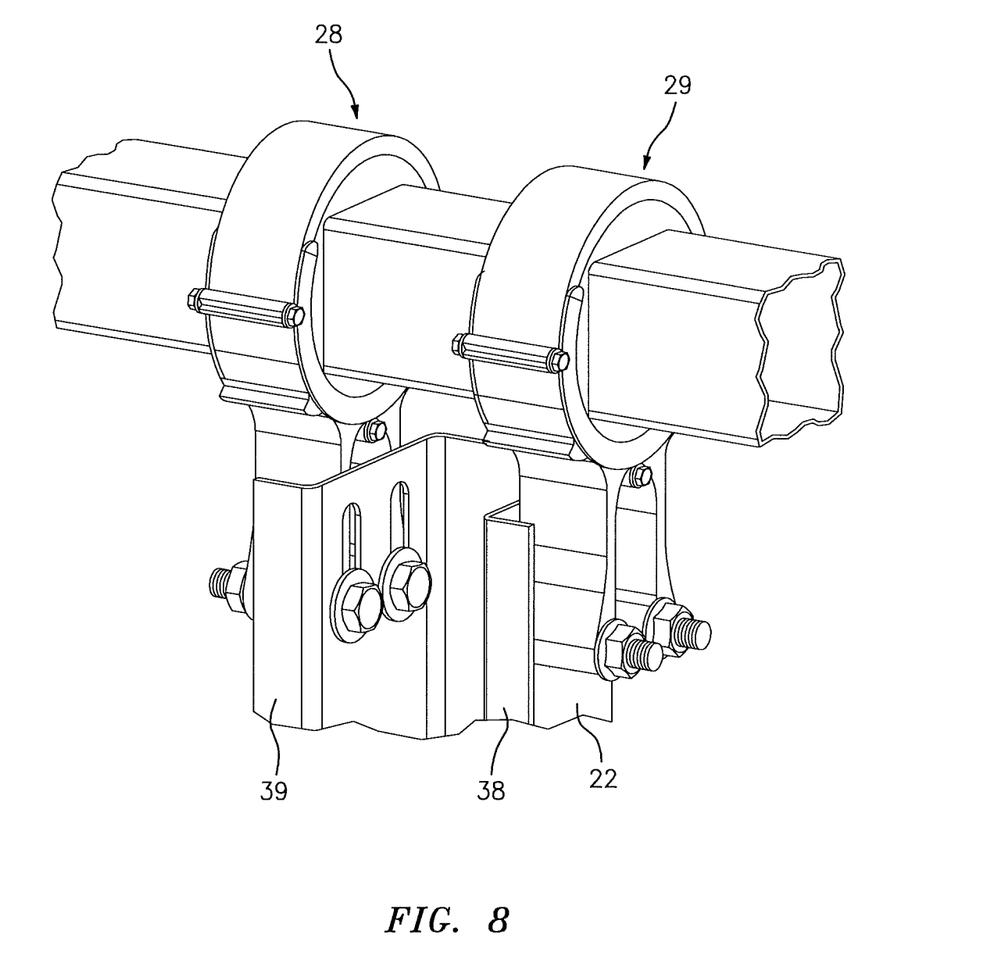
FIG. 8 illustrates two adjacent bearing assemblies configured to rotatably mount the rotatable shaft.
Figure 9:
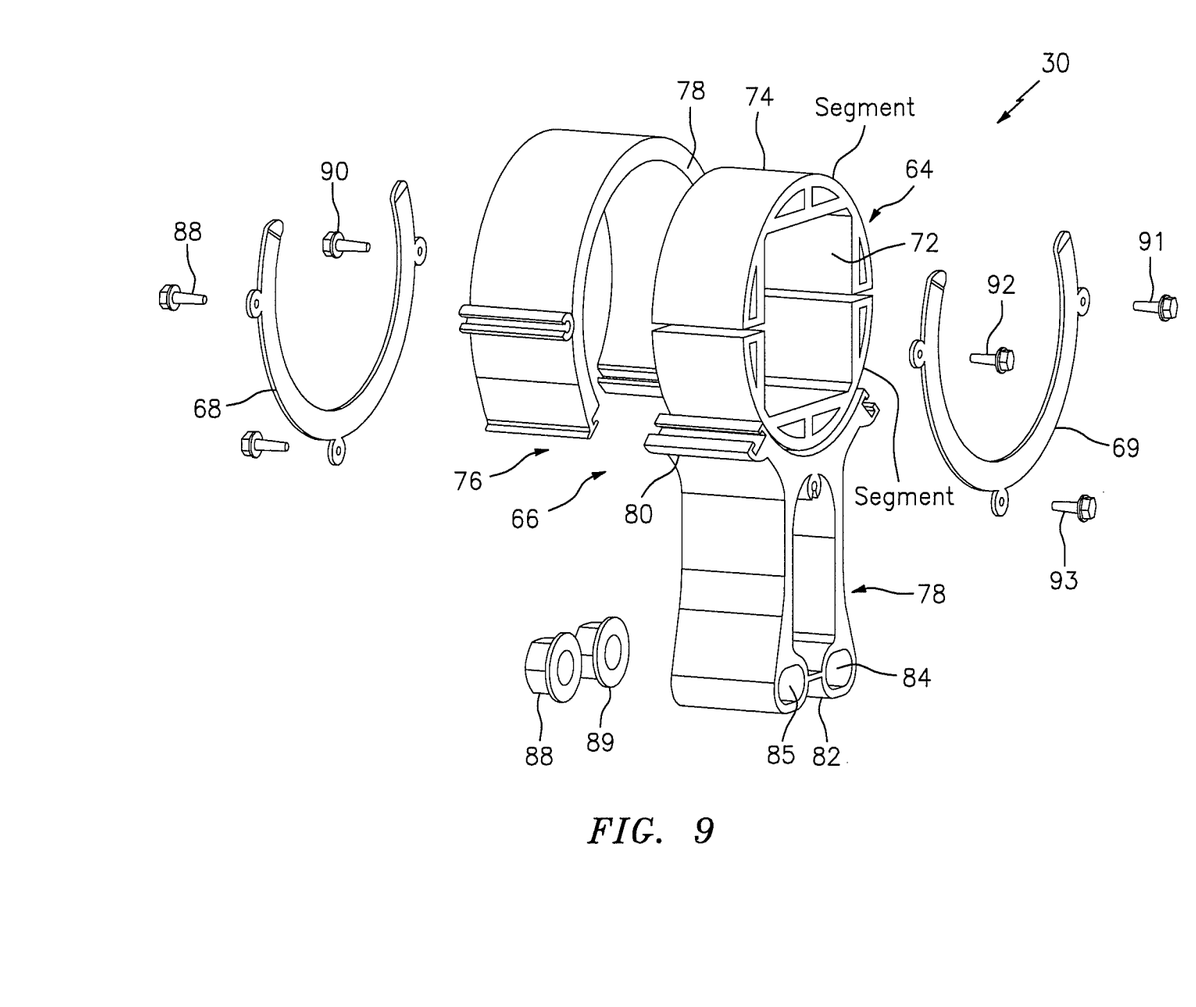
FIG. 9 illustrates an exploded view of an embodiment of a bearing assembly.

Referring to FIGS. 5, 7 and 8, bearing assemblies 28-30 are configured to rotatably mount the rotatable shaft 26 to the stationary structural members 22. Referring now to FIG. 9, each bearing assembly may include a bearing wheel 64, a bearing collar 66 and one or more capture rings 68-69.

Referring to FIG. 9, the bearing wheel 64 has a rotational axis, which is co-axial with the rotational axis 54 of the rotatable shaft 26 (see FIG. 5). The bearing wheel 64 includes and extends radially between an inner surface 72 and an outer surface 74. The inner surface 72 at least partially forms a bore. This bore extends axially through the bearing wheel 64 along the rotational axis 54. The bore may have a polygonal (e.g., square) cross-sectional geometry configured complementary to the geometry of the rotatable shaft. The bore may thereby receive the rotatable shaft axially therethrough. Of course, in other embodiments, the bore may be slightly larger than the rotatable shaft 26 and/or have a different geometry than that of the rotatable shaft where, for example, an intermediate element such as a bushing or a sleeve is disposed between the bearing wheel and the shaft. The outer surface 74 may have a circular cross-sectional geometry.

Figure 10:
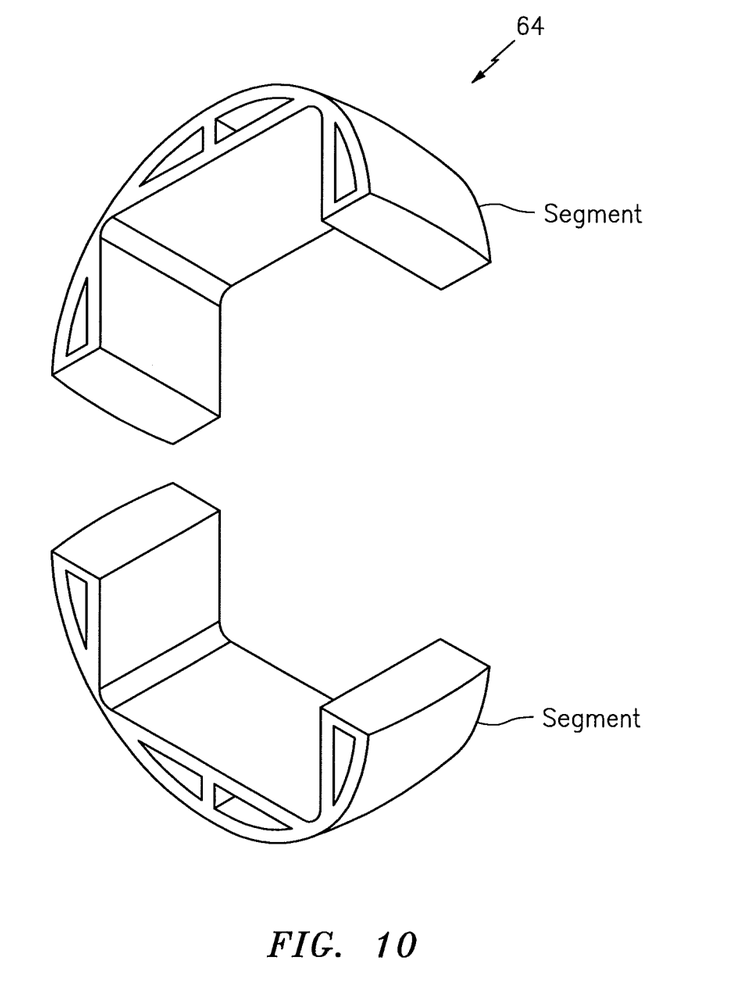
FIG. 10 illustrates an exploded view of first and second segments of a bearing wheel of the bearing assembly.

The bearing wheel 64 may be formed as a single, integral body. Alternatively, the bearing wheel may be formed from a plurality of discrete segments (e.g., discretely formed halves) as shown in FIGS. 9 and 10. These segments may be connected together, or not connected together; e.g., merely abutted against one another.

Referring again to FIG. 9, the bearing collar 66 may include a collar base 76 and a collar mount 78. The collar base 76 includes an inner surface 72 configured to circumscribe and slidingly engage the outer surface 74 of the bearing wheel 64. This collar base 76 may be formed as a single, integral body. Alternatively, the collar base 76 may be formed from a plurality of discrete segments secured together to form a hoop structure as shown in FIG. 9. The segments of FIG. 9, in particular, are secured together via locking tongue and groove (mortise) joints; however, other attachment methods and/or hardware may be used to secure the segments together.

In the exemplary embodiment of FIG. 9, bottom segment 80 extends between about 30 degrees and about 90 degrees around the rotational axis 54. The top segment extends between about 330 degrees and about 270 degrees around the rotational axis 54. The present disclosure, of course, is not limited to the foregoing values. For example, in other embodiments, each segment may extend about 180 degrees around the rotational axis 54, or otherwise.

The collar mount 78 projects radially out (e.g., down) from collar base 76 (e.g., the bottom segment) to a distal mount end 82. The collar mount 78 may be formed integrally with the collar base 76 (e.g., the bottom segment), or attached thereto. The collar mount 78 includes a plurality of mounting apertures 84, 85 at the distal mount end 82. Each of these mounting apertures 84, 85 extends axially through the collar mount 78. The mounting apertures 84, 85 are configured to respectively receive fasteners 88, 89 (e.g., bolts or otherwise) for securing the collar mount 78 to a respective one of the stationary structural members 22, 24 as shown in FIGS. 7 and 8. In particular, each fastener extends through a respective one of the mounting apertures in the collar mount and a respective one of the mounting apertures (e.g., slots) 84, 85 in the stationary structural member 22, 24. The fasteners may be positioned within the mounting apertures (e.g., slots) in the stationary structural member so as to adjust the vertical height or lateral position of the bearing assembly; e.g., in order to ensure the rotational axis is as straight-line and/or level as possible as the rotatable shaft passes through the bearing assemblies. The fasteners may then be tightened to clamp the collar mount 78 to the respective stationary structural member 22, 24.

The capture rings 68, 69 are secured to opposing axial sides of the collar base 76 using, for example, one or more fasteners (e.g., screws) 88-93. Each capture ring 68, 69 projects radially inward from the inner surface 78 of the collar base 76 and thereby overlaps an axial end of the bearing ring 66 to prevent that end from sliding out of the bore of the collar base.

Figure 11:
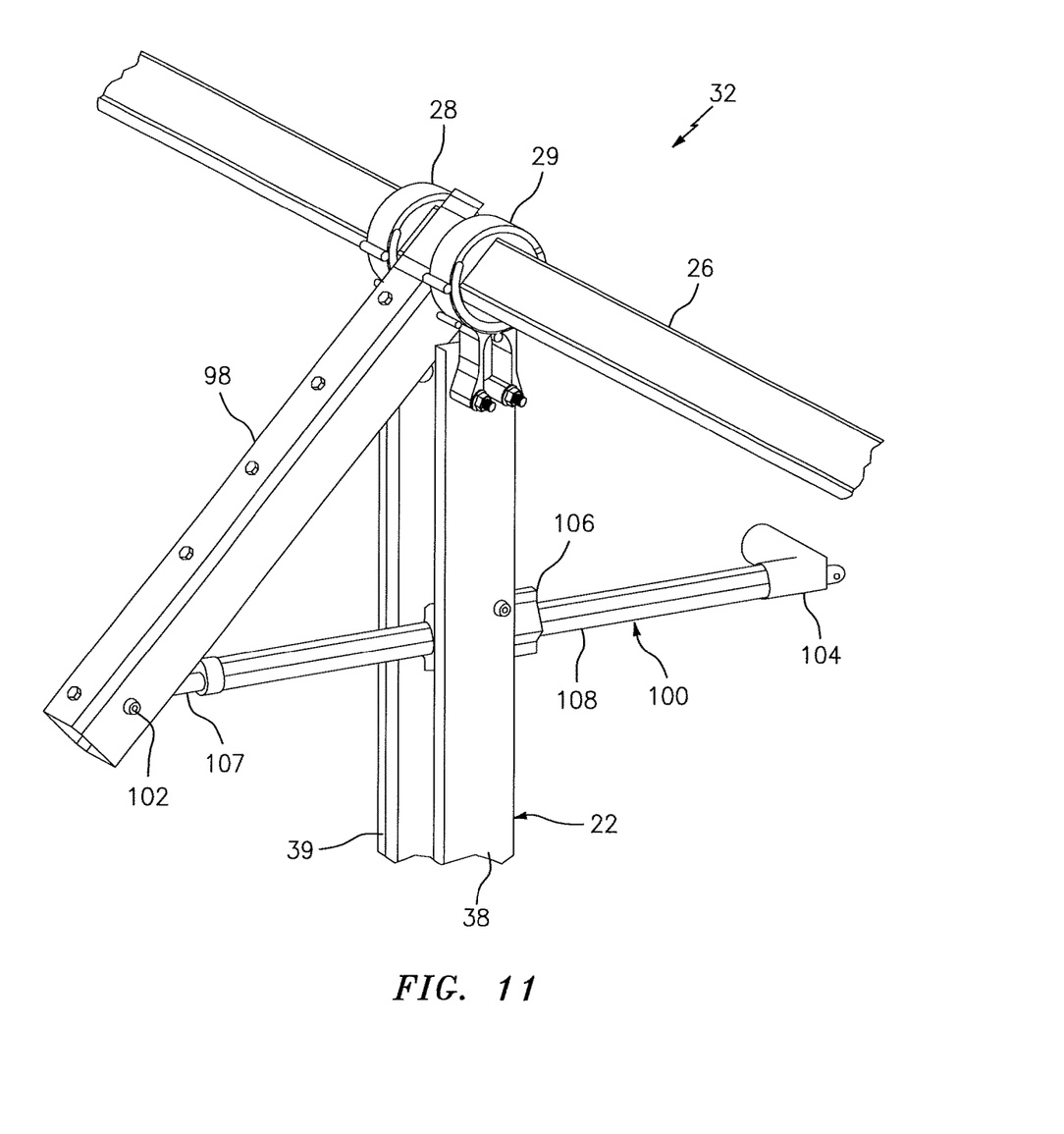
FIG. 11 illustrates an exemplary embodiment of the drive mechanism.

FIG. 11 illustrates an exemplary embodiment of the drive mechanism 32. This drive mechanism includes a drive arm 98 and an actuator 100. The drive arm 98 is substantially axially aligned with the stationary structural member 22 along the rotational axis. A first end of the drive arm is secured to the rotatable shaft 26. Distal end flanges 38, 35 of the drive arm 98, for example, are clamped around the rotatable shaft 26 between two adjacent and proximate bearing assemblies 28, 29.

The actuator 100 is substantially axially aligned with the stationary structural member and the drive arm along the rotational axis. The actuator 100 is pivotally connected to the drive aim 98. More particularly, a first end of the actuator projects through an opening in the drive arm and is pivotally connected to and between two sides of the drive aim at its second end by a shaft; e.g., a threaded rod 102. The actuator is also connected to the stationary structural member 22; e.g., the center post. More particularly, an intermediate portion of the actuator 100 is pivotally connected to and between the first and second flanges 38, 39 of the stationary structural member 22. An end portion of the actuator 100 may project through an opening in the web of the stationary structural member to a second end of the actuator, where a motor 104 for actuating the actuator may be located. The intermediate portion of the actuator may be connected to the flanges 38, 39 by an actuator mount 106 clamped therearound, or with trunnion blocks welded to the actuator housing, and a shaft.

The actuator 100 may be a hydraulic piston actuator or a screw drive mechanism actuator. The actuator may thereby include a pushrod 107 and a base 108, where the push rod 107 projects out from and slides within and relative to the base. The pushrod 107 may be pivotally connected to the drive arm 98. The base 108 may be pivotally connected to the stationary structural member 22. Of course, the drive mechanism of the present disclosure is not limited to the foregoing exemplary actuator configuration or mounting scheme.

Figure 12:
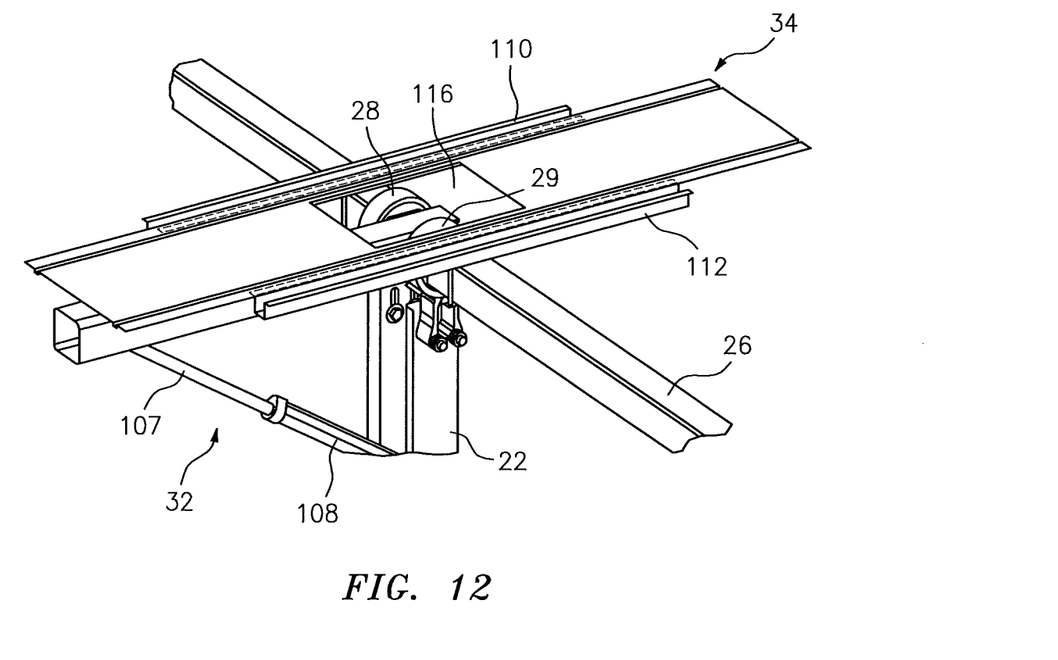
FIG. 12 illustrates an exemplary embodiment of a wind break plate and support members operably positioned on the rotatable shaft.
Figure 13:
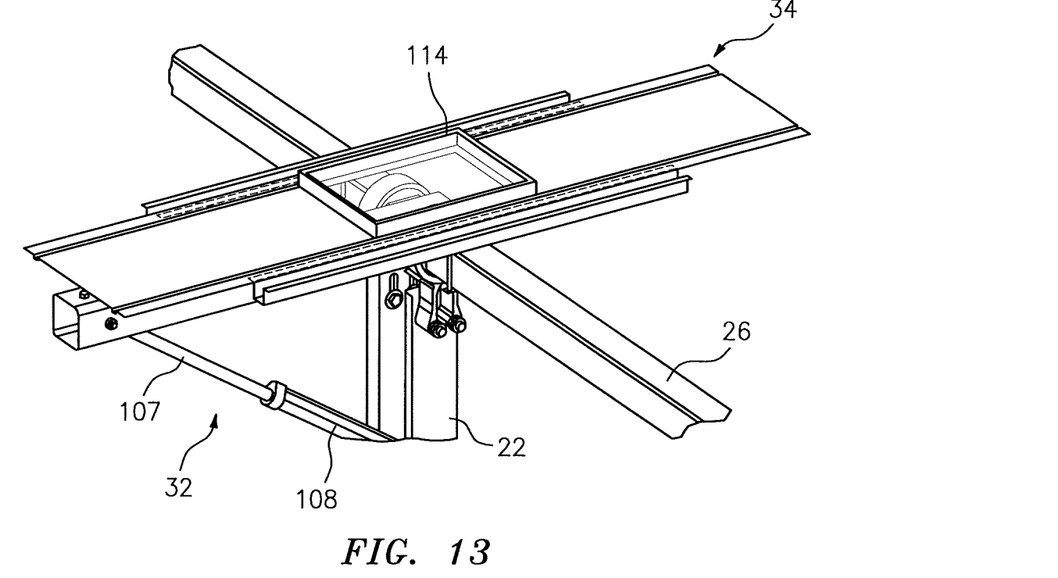
FIG. 13 illustrates an exemplary embodiment of a wind break plate, support members and a solar panel operably positioned on the rotatable shaft.

FIGS. 12 and 13 illustrate an exemplary embodiment of the wind break plate 34. This wind break plate 34 is mounted to the rotatable shaft 26. In particular, the wind break plate of FIGS. 12 and 13 is mounted to a pair of support (e.g., purlin) members 110, 112, which in turn are mounted to the rotatable shaft 26. The support members are located on opposing sides of the stationary structural member 22 and/or two respective bearing assemblies 28, 29 along the rotational axis. The wind break plate 34 is configured to at least partially cover the distal member end of the stationary structural member and the drive mechanism. The wind break plate may also provide a mounting surface for a solar panel 114, which is operable to provide power to the drive mechanism 32. The solar panel 114 may be nested with an opening 116 in the wind break plate 34 over the distal member end.

Referring again to FIG. 1, a pair of the solar panels 17, 18 are located adjacent to and on opposing sides of the wind break plate. The wind break plate may substantially close a lateral gap between the solar panels.

The solar panel installation of FIG. 1 includes a control system. This control system may include a single node controller, or a plurality of node controllers depending upon the specific configuration of the solar panel installation. For example, the control system may include a single node controller where the solar panel installation includes a single drive mechanism. Alternatively, the control system may include a plurality of node controllers where the solar panel installation includes multiple drive mechanisms and those mechanisms are divided into different nodes (of one or more mechanisms) with independent control. The control system may also include a master controller in signal communication (e.g., hardwired and/or wirelessly connected) with the one or more node controllers.

Figure 14:
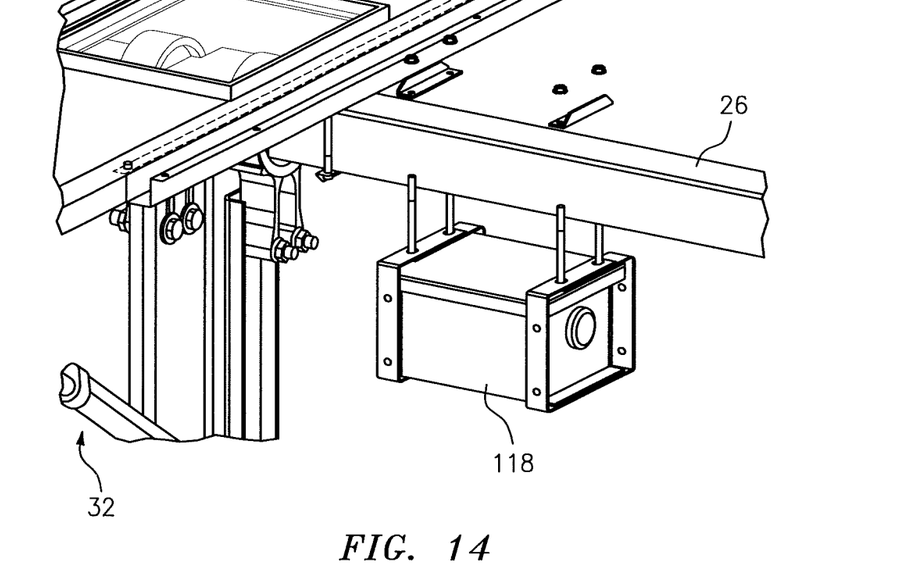
FIGS. 14 and 15 illustrate an exemplary embodiment of a node controller with the rotatable shaft.
Figure 15:
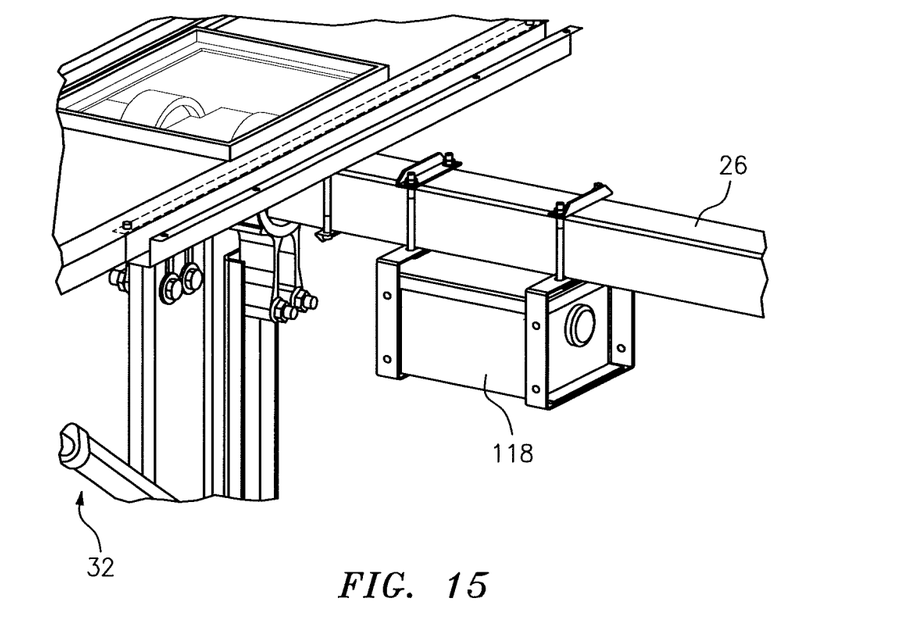

An exemplary embodiment of a node controller 118 is shown with the rotatable shaft 26 in FIGS. 14 and 15. This node controller 118 may include a processor, a tilt measuring device (e.g., a sensor), a clock, a memory, one or more motor drivers, and a communication device (e.g., a transceiver, an input port and/or an output port). The tilt measuring device is configured to measure the tilt of the solar panels, which may be measured directly or indirectly through the rotational position of the rotatable shaft 26. The memory may include one or more lookup tables. These lookup tables may be used by the processor to determine what tilt the solar panel array should be positioned at a certain time of day based on one or more of the following parameters: location; sun elevation and/or azimuth; row spacing; and slope for backtracking analysis. The motor drives are configured to command the motor for the actuator to turn and actuate the actuator until an appropriate solar panel tilt is obtained. The communication device is configured to provide communication between the node controller and another device; e.g., the master controller. A snow depth sensor may also be included with or connected to the node controller 118. This snow depth sensor is configured to provide data to the node controller, which can trigger a warning and/or an adjustment in operational tilt range.

The master controller may be configured to communicate wirelessly with one or more node controllers. The master controller is configured to synch up the node controller clocks to a master controller clock periodically (e.g., every day) to make sure all of the clocks are all at the exact same time so tilts are uniform. The master controller is also configured to receive information from the node controllers about time of day and tilt to see if any solar panels are not at proper tilt or are not running. The master controller may subsequently relay this data to another device such as a cell phone, or wireline the data to the cloud or customer communications network for service call notification and analysis.

The master controller may include or be connected to a wind speed sensor (e.g., an anemometer) configured to read wind speed. The master controller may monitor the wind speed and the tilt of the system as determined, for example, using a lookup table for the site. The master controller may calculate at what wind speed the system should move towards a stow position. The master controller may then broadcast control signals to the node controllers to move the solar panels toward their stow position in a certain increment in degrees of tilt. The master controller may then continue to monitor the windspeed, and if more adjustments are needed to move further towards full stow position due to increasing windspeed the master controller may send additional broadcast stow messages to the node controllers. By providing incremental partial stow messages and movements to match up tilt with windspeed and only change the tilt to that closest to optimal based on monitored windspeed, the solar panels may not need to be moved to the fully stowed position, battery drain may be minimized and/or the power output of the entire array may be maximized by reducing time that the solar panels are moved away from optimal power producing position in high speed wind conditions. Also, by having the stow position be at the fully retracted actuator position with panels facing west, positioning in the stow position may be optimized to be mostly in the afternoon hours when thunderstorms are prevalent, which increases the average stow windspeed dramatically, which again reduces battery usage and reduces any power loss from the array being moved out of optimal power producing tilt due to wind events.

Figure 16:
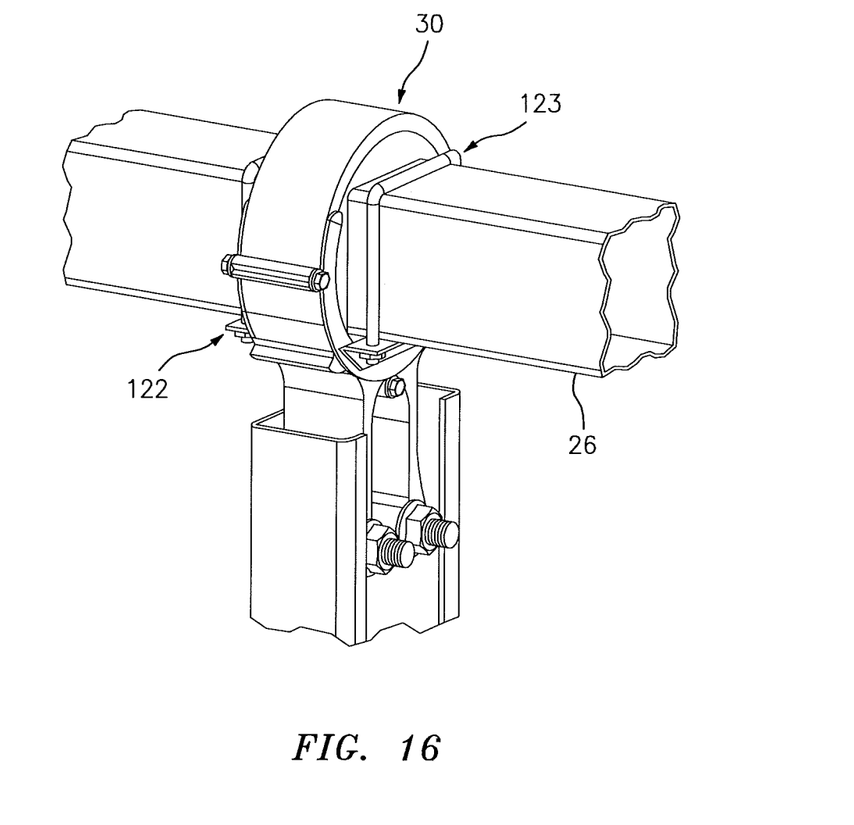
FIG. 16 illustrates a bearing assembly operably connected to the rotating shaft and the structural member and including one or more lateral capture devices.

In some embodiments, the solar panel array may include one or more lateral capture devices 122, 123 as shown in FIG. 16. In an exemplary embodiments, the lateral capture devices are configured as U-bolts with associated clamping plates (e.g., brackets). The lateral capture devices may be put on either side (or just one side) of the bearing, adjacent the bearing, and clamped onto the rotatable shaft. The clamped lateral capture devices may thereby prevent lateral movement of the rotatable shaft 26 relative to the bearing. In this manner, the rotatable shaft may remain properly positioned even where the solar panel installation is on sloped ground, there is a seismic event, the wind pushes against the solar panels, etc.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a solar panel installation, the assembly comprising: a stationary structural member;
   a rotatable shaft;
   a bearing wheel with a rotational axis, the bearing wheel including and extending radially between an inner surface and an outer surface, wherein the inner surface at least partially forms a bore, the bore extends axially through the bearing wheel along the rotational axis, and the bore has a cross-sectional geometry configured to receive the rotatable shaft which has a complementary cross-sectional geometry, and wherein the outer surface extends circumferentially around the rotational axis, and the outer surface has a circular cross-sectional geometry; and
   a bearing collar comprising a collar base and a collar mount, wherein the collar base includes an inner surface configured to circumscribe and slidingly engage the outer surface of the bearing wheel, wherein the collar mount projects radially out from the collar base to a distal mount end, and wherein a plurality of mounting apertures at the distal mount end extend axially through the collar mount, and the mounting apertures are configured to respectively receive fasteners for securing the collar mount to the stationary structural member; and
   a pair of capture rings secured to opposing axial sides of the collar base, wherein the capture rings project radially inward and thereby overlap opposing axial ends of the bearing ring.

2. The assembly of claim 1, wherein the stationary structural member is configured to be securely anchored to the ground.

3. The assembly of claim 1, wherein the rotatable shaft comprises a length of square tubing.

4. The assembly of claim 1, wherein the rotatable shaft is configured to structurally support one or more solar panels.

5. The assembly of claim 1, further comprising:
   a plurality of fasteners securing the bearing collar to the stationary structural member, each of the fasteners extending through a respective one of the slots and a respective one of the mounting apertures, wherein one or more of the fasteners is operable to be selectively positioned within the slots to change the vertical and/or lateral position of the bearing collar relative to the stationary structural member.

6. The assembly of claim 5, further comprising:
a second bearing wheel having a bore, wherein the rotatable shaft is mated with the bearing wheel and projects axially through the bore of the second bearing wheel;
a second bearing collar comprising a second collar base and a second collar mount, wherein the second collar base is configured to house the second bearing wheel and provide a bearing surface for the second bearing wheel to slidingly engage while moving with the rotatable shaft about the rotational axis, wherein the second collar base projects radially out from the second collar base to a second distal mount end, and wherein a plurality of second mounting apertures at the second distal mount end extend axially through the second collar mount; and
a plurality of second fasteners securing the second bearing collar to the stationary structural member, each of the second fasteners extending through a respective one of the slots and a respective one of the second mounting apertures, wherein one or more of the second fasteners is operable to be selectively positioned within the slots to change the vertical and/or lateral position of the second bearing collar relative to the stationary structural member and the other bearing collar.

7. The assembly of claim 1, further comprising:
a drive arm secured to the rotatable shaft and aligned with the stationary structural member along the rotational axis; and
an actuator pivotally connected to the drive arm and pivotally connected between and to first and second flanges, wherein a portion of the actuator projects through an opening in the web, and wherein the actuator is configured to change its length in order to move the drive arm relative to the stationary structural member and thereby rotate the rotatable shaft about the rotational axis.

8. The assembly of claim 7, wherein the portion of the actuator includes a motor.

9. The assembly of claim 7, further comprising an actuator mount clamped onto the actuator, wherein the actuator mount is pivotally connected to the stationary structural member by a shaft which extends between and is connected to the first and the second flanges.

10. The assembly of claim 7, wherein the actuator comprises a base and a pushrod, the base is pivotally connected to the stationary structural member and the pushrod is pivotally connected to the drive arm.

11. The assembly of claim 7, wherein the rotatable axis is generally perpendicular the length of the stationary structural member.

12. The assembly of claim 7, wherein the actuator is pivotally connected to the drive arm between two flanges of the drive arm.

13. The assembly of claim 7, wherein the actuator comprises a hydraulic piston.

14. The assembly of claim 7, wherein the actuator comprises a screw drive mechanism.

15. The assembly of claim 1, further comprising:
a wind break plate mounted to the rotatable shaft, the wind break plate configured to at least partially cover the distal member end and the drive mechanism.

16. The assembly of claim 15, further comprising a pair of purlin members, wherein the purlin members are located on opposing sides of the stationary structural member along the rotational axis, and wherein the purlin members mount the wind break plate to the rotatable shaft.

17. The assembly of claim 15, further comprising a pair of solar panels, wherein the solar panels are located adjacent to the wind break plate and mounted to the rotatable shaft, and wherein the wind break plate substantially closes a gap between the solar panels.

18. The assembly of claim 15, further comprising a solar panel mounted to the wind break plate.

19. The assembly of claim 18, wherein the solar panel is operable to provide power to the drive mechanism.

20. The assembly of claim 18, wherein the solar panel is nested with an opening in the wind break plate over the distal member end.

21. An assembly for a solar panel installation, the assembly comprising:
a stationary structural member;
a rotatable shaft;
a bearing wheel with a rotational axis, the bearing wheel including and extending radially between an inner surface and outer surface, wherein the inner surface at least partially forms a bore, the bore extends axially through the bearing wheel along the rotational axis, and the bore has a cross-sectional geometry configured to receive the rotatable shaft which has a complementary cross-sectional geometry, and wherein the outer surface extends circumferentially around the rotational axis, and the other surface has a circular cross-sectional geometry;
a bearing collar comprising a collar base and a collar mount, wherein the collar base includes an inner surface configured to circumscribe and slidingly engage the outer surface of the bearing wheel, wherein the collar mount projects radially out from the collar base to a distal mount end, and wherein a plurality of mounting apertures at the distal mount end extend axially through the collar mount, and the mounting apertures are configured to respectively receive fasteners for securing the collar mount to the stationary structural member;
a plurality of fasteners securing the bearing collar to the stationary structural member, each of the fasteners extending through a respective one of the slots and a respective one of the mounting apertures, wherein one or more of the fasteners is operable to be selectively positioned within the slots to change the vertical and/or lateral position of the bearing collar relative to the stationary structural member;
a second bearing wheel having a bore, wherein the rotatable shaft is mated with the bearing wheel and projects axially through the bore of the second bearing wheel;
a second bearing collar comprising a second collar base and a second collar mount, wherein the second collar base is configured to house the second bearing wheel and provide a bearing surface for the second bearing wheel to slidingly engage while moving with the rotatable shaft about the rotational axis, wherein the second collar base projects radially out from the second collar base to a second distal mount end, and wherein a plurality of second mounting apertures at the second distal mount end extend axially through the second collar mount;

a plurality of second fasteners securing the second bearing collar to the stationary structural member, each of the second fasteners extending through a respective one of the slots and a respective one of the second mounting apertures, wherein one or more of the second fasteners is operable to be selectively positioned within the slots to change the vertical and/or lateral position of the second bearing collar relative to the stationary structural member and the other bearing collar;

a wind break plate mounted to the rotatable shaft, the wind break plate configured to at least partially cover the distal member end and the drive mechanism;

a air of purlin members, wherein the purlin members are located on opposing sides of the stationary structural member along the rotational axis, and wherein the purlin members mount the wind break plate to the rotatable shaft;

a pair of solar panels, wherein the solar panels are located adjacent to the wind break plate and mounted to the rotatable shaft, and wherein the wind break plate substantially closes a gap between the solar panels; and a solar panel mounted to the wind break plate, and wherein the solar panel is operable to provide power to the drive mechanism and, wherein the solar panel is nested with an opening in the wind break plate over the distal member end.

* * * * *